United States Patent [19]

Sumner et al.

[11] Patent Number: 4,699,578

[45] Date of Patent: Oct. 13, 1987

[54] TIRE MOLD AND APPARATUS FOR VULCANIZING A TIRE BY MEANS OF ELECTROMAGNETICALLY INDUCED HEAT

[75] Inventors: Anthony J. M. Sumner, Sutton Coldfield; Anthony R. Wright, Southport, both of England

[73] Assignee: Apsley Metals Limited, United Kingdom

[21] Appl. No.: 800,316

[22] Filed: Nov. 21, 1985

[30] Foreign Application Priority Data

Nov. 28, 1984 [GB] United Kingdom ............... 8430010

[51] Int. Cl.⁴ ............................................. B29C 35/08
[52] U.S. Cl. ........................................ 424/33; 264/25; 264/315; 264/326; 425/41; 425/43; 425/50; 425/52; 425/174.8 R
[58] Field of Search ............ 425/33, 35, 41, 42, 425/50–52, 54, 58, 43, 174.8 R, 174.8 E, 174.4, 389, 417, DIG. 13, DIG. 14, DIG. 19; 156/124; 264/25, 26, 315, 319, 326

[56] References Cited

U.S. PATENT DOCUMENTS

| | | | |
|---|---|---|---|
| 808,479 | 12/1906 | Riddle | 264/326 |
| 1,379,595 | 5/1921 | Post | 425/41 |
| 1,507,686 | 9/1924 | Root | 425/41 X |
| 1,605,683 | 11/1926 | Meyer et al. | 425/42 X |
| 1,791,934 | 2/1931 | Northrup | 425/41 X |
| 1,888,702 | 11/1932 | Snyder | 425/42 |
| 2,451,992 | 10/1948 | Grotenhuis | 425/41 |
| 3,240,653 | 3/1966 | Mattox et al. | 425/41 X |
| 3,294,606 | 12/1966 | Morgan | 156/124 |
| 3,429,005 | 2/1969 | Macmillan | 425/41 X |
| 3,892,505 | 7/1975 | Doucherain et al. | 425/41 |
| 4,534,812 | 8/1985 | Fukui et al. | 264/326 X |

FOREIGN PATENT DOCUMENTS

| | | |
|---|---|---|
| 167874 | 8/1921 | United Kingdom . |
| 238063 | 8/1925 | United Kingdom . |
| 301477 | 11/1928 | United Kingdom . |
| 279883 | 1/1929 | United Kingdom . |
| 301868 | 11/1929 | United Kingdom . |
| 533417 | 2/1941 | United Kingdom . |
| 572425 | 10/1945 | United Kingdom . |
| 639997 | 7/1950 | United Kingdom . |
| 642174 | 8/1950 | United Kingdom . |
| 840305 | 7/1960 | United Kingdom . |
| 967235 | 8/1964 | United Kingdom . |
| 1342880 | 1/1974 | United Kingdom . |
| 1588729 | 4/1981 | United Kingdom . |

*Primary Examiner*—Richard L. Chiesa
*Attorney, Agent, or Firm*—Stevens, Davis, Miller & Mosher

[57] ABSTRACT

A mould particularly as used in the manufacture of a product from elastomeric material which is required to be heated.

Preferably the heating is carried out by means of an electric current which may be induced electromagnetically.

The product may be a tire.

6 Claims, 5 Drawing Figures

TIRE MOLD AND APPARATUS FOR VULCANIZING A TIRE BY MEANS OF ELECTROMAGNETICALLY INDUCED HEAT

BACKGROUND OF THE INVENTION

This invention relates to a mould, particularly a mould as used in the manufacture of a product from elastomeric material which is required to be heated. One example of such a product is a tire wherein vulcanizing rubber composition is shaped and heated in the mould.

A tire mould has conventionally needed to be strong and therefore massive to withstand pressure applied either externally or internally. This means that the mould consists of several metal components having in total a relatively large volume. As a result the total thermal capacity of the mould is correspondingly large. Thus a large quantity of heat is needed, to raise the temperature not only of the product but also of the mould to the required vulcanizing temperature. Thus, effectively, much heat energy is wasted.

SUMMARY OF THE INVENTION

It is an object of the present invention to attempt to reduce the amount of heat which is not used in heating the product, i.e. to reduce heat wastage.

In accordance with the present invention a mould comprises at least one mould member defining at least part of a mould cavity for containing the material to be moulded and heated, the mould member comprising thermally and electrically insulating material and, immediately adjacent the mould cavity, at least one electrically conductive heating element in which electric current is caused to flow to heat the material forming the product being moulded. The electric current may be induced electromagnetically.

The insulating material of the mould member may be a plastic, e.g. "NYLATRON" (Trade Name), possibly impregnated with asbestos, or another polymeric material, or ceramic, e.g. silica. The choice of insulating material depends on the temperature to which the heating element rises, and the pressure which may be applied.

The mould may be used for the production of a pneumatic tire in which case the mould member may comprise a tread moulding ring of thermally insulating material, provided on its moulding surface with a layer of metal or metal alloy, e.g. copper or brass. The ring may be divided into a plurality of sectors.

BRIEF DESCRIPTION OF THE DRAWINGS

Two embodiments of the invention will now be described by way of example with reference to the accompanying drawings of which.

DESCRIPTION OF A PREFERRED EMBODIMENT

Figure 1:
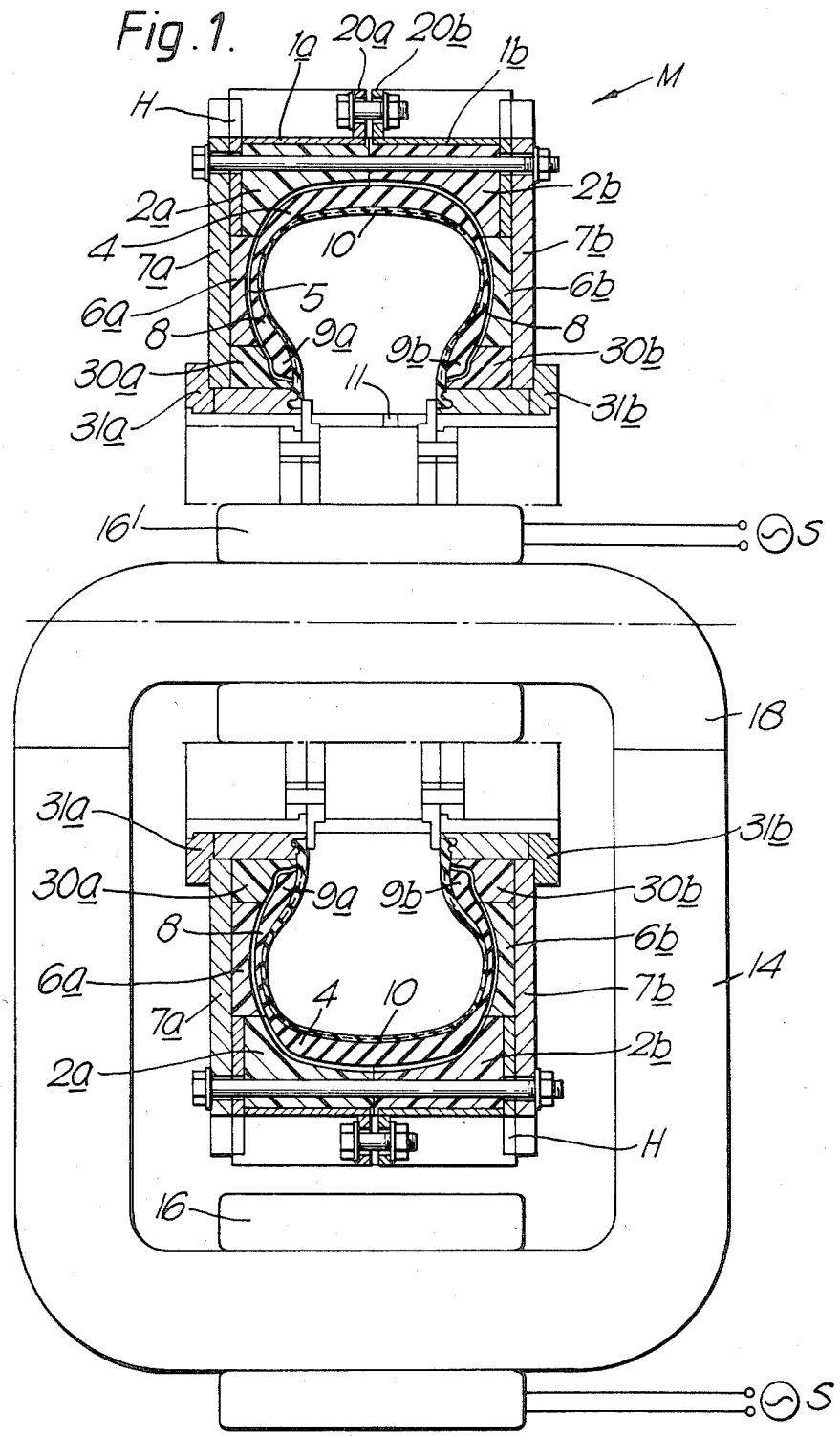
FIG. 1 shows a cross-section through an annular tire mould in accordance with the first embodiment.
Figure 2:
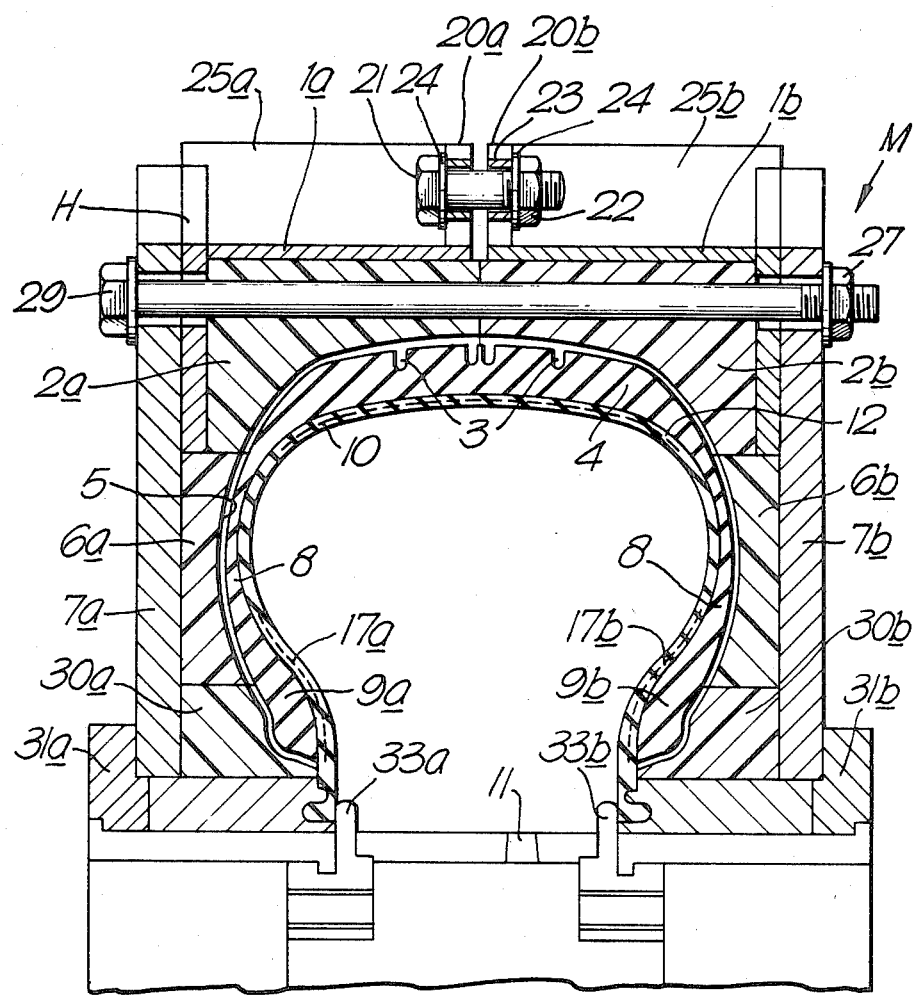
FIG. 2 shows an enlargement of part of the mould shown in FIG. 1.
Figure 3:
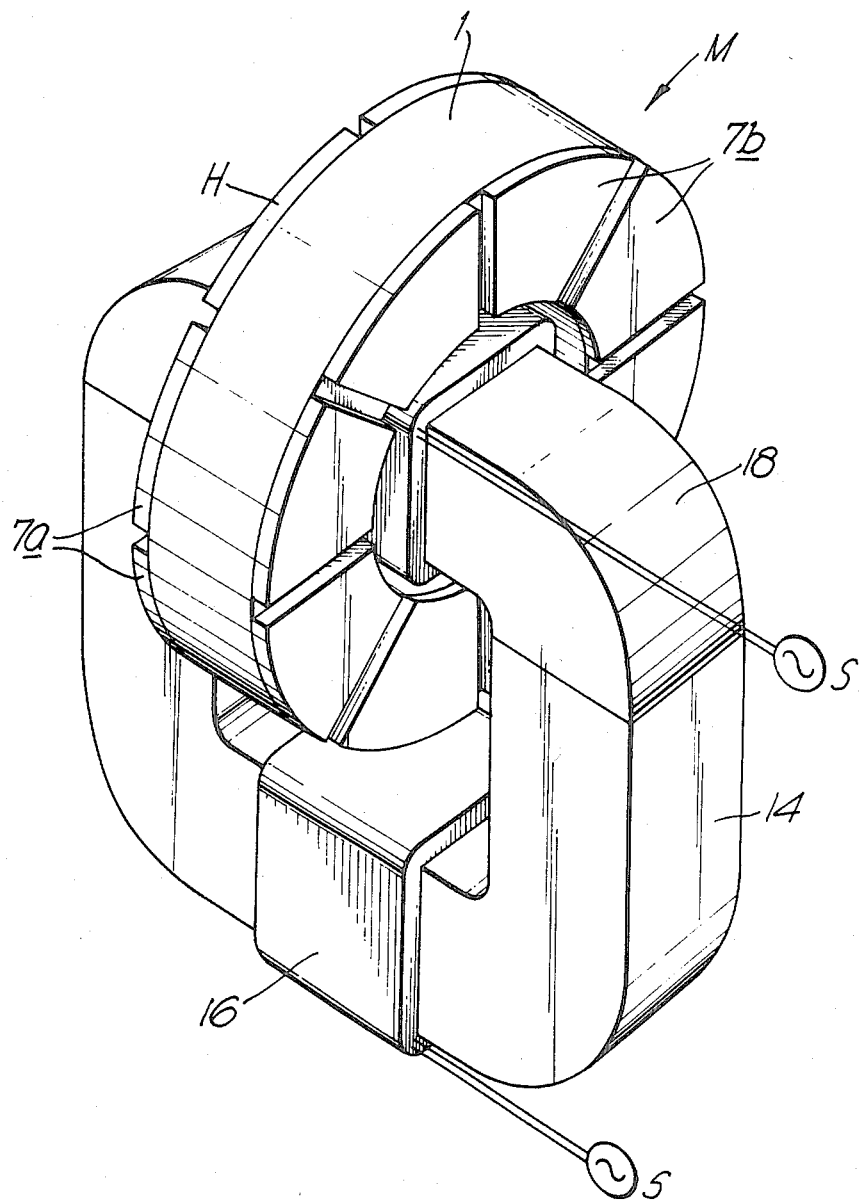
FIG. 3 shows a simplified perspective view of the tire mould and apparatus for inducing a heating current.

The mould M as shown in FIGS. 1, 2 and 3 comprises an outer housing H for providing support for various ring-shaped mould components (2a, 2b, 6a, 6b, 30a, 30b) each made of insulating material (which may be polymeric) capable of withstanding the vulcanizing temperature of the tire e.g. about 200° C. and the internal pressure applied to the tire during the vulcanizing process.

As can be seen in detail in FIGS. 1 and 2 the housing H comprises an outer ring 1 split into two circumferentially extending half rings 1a and 1b formed with respective flanges 20a and 20b bolted together by means of a plurality of circumferentially-spaced apart bolts 21 and nuts 22. The flanges are provided with bolt holes each lined with an electrically insulating sleeve 23 and the nuts and bolts are separated from the flanges by electrically insulating washers 24.

The half-rings 1a and 1b are themselves divided into semi-circular sectors (not shown) formed with flanges 25a, 25b extending in an axial direction, the sectors being bolted together by nuts and bolts (not shown) through the flanges. The sectors are electrically insulated from one another.

The housign at the side of the mould comprises a plurality of spaced-apart sector plates 7a, 7b held in position by discontinuous rings 31a, 31b each comprising two or three sectors bolted together.

The whole housing is formed of steel but the various parts are insulated from one another so there is no complete electrically conductive ring around the outside of the mould. The whole is held together by a plurality of long bolts 29 and nuts 27 passing through the sector plates and the mould components 2a and 2b.

The interior of the mould comprises various mould components 2a, 2b, 6a, 6b, 30a, 30b as can be seen in detail in FIGS. 1 and 2. Preferably the components are complete rings but they may be divided into sectors.

The radially inner surface of the tread moulding components 2a, 2b comprises a plurality of ribs 3 etc for moulding grooves etc in the tread surface of the tire 4 being manufactured. The inner surface of the mould components is provided with an electrically conductive layer 5 e.g. copper or brass, through which an electric heating current may be caused to flow thus causing the rubber composition of the tread of the tire 4 being manufactured to be vulcanizing.

The moulding components also include sidewall moulding plates 6a, 6b one on each side of the mould each of which mould a tire sidewall 8, and bead moulding rings 30a, 30b which define the final shape of the tire bead regions 9a, 9b. These are also made of a suitable insulating material covered with a conducting layer 5 e.g. copper or brass. They are supported by external side members 7a, 7b. The conducting layer 5 may itself be coated with a non-stick layer e.g. a very thin layer of polytetrafluoroethylene, to facilitate release of the vulcanizing tire from the mould and to prevent contamination of the tire by the metal of the conducting layer.

The shape of the interior of the tire 4 is defined by means of an inflatable curing bag 10 or tube made of elastomeric material, the tube being held in position by clips 33a and 33b. During the vulcanizing of the tire the curing bag or tube is pressurized e.g. with air or nitrogen through a suitable inlet 11 to press the vulcanizing rubber composition of the tire 4 against the moulding surfaces of the tread moulding components 2a, 2b, the sidewall plates 6a, 6b and the bead moulding rings 30a, 30b. This curing bag may be of conventional form, but is preferably formed with electrically conducting stranded wires 12 which extend in the form of rings around the bag embedded within the rubber of the bag itself to withstand distortion. A current may be caused to flow through the ring to heat the interior surface of the tire. Alternatively the bag may be pressurized with a heating fluid e.g. steam or hot water.

The curing bag itself may be made with an undulating surface which when the bag is pressurized takes up the smooth profile required for the interior surface of the tire being moulded.

Figure 4:
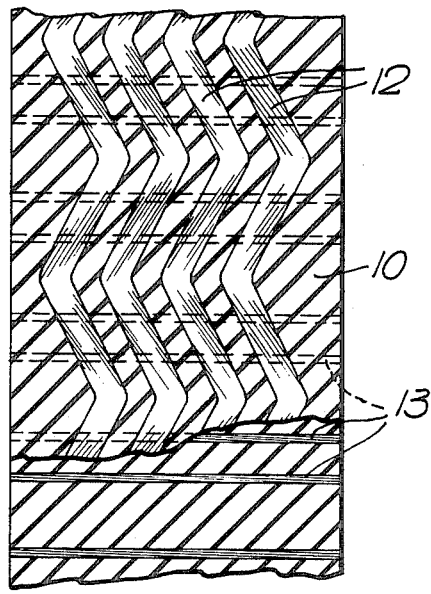
FIG. 4 is a plan view of part of the tread region of the bag inside the mould (part of the rubber of the bag being omitted)

As can be seen in FIG. 4 the stranded wire rings 12 extend in zig-zag fashion around the crown region of the bag. Similar zig-zag shaped electrically conducting stranded wires 17a and 17b are also provided in that part of the bag adjacent the tire bead region and lower sidewalls. Additionally, as can be seen in FIG. 4, transversely extending strips or wires 13 of copper or brass may also be embedded within the bag to help distribute the heat energy more evenly.

The current needed to heat the tire may be induced electromagnetically as shown in FIGS. 1 and 3. The mould M is mounted by supports (not shown) around a laminated closed core 14. A 50 Hertz (or other suitable frequency) supply S is connected to the primary turns 16 around the core. As shown in FIG. 3 the primary turns may be around a different part of the core 14 from the mould M but preferably the primary turns are positioned within the mould as shown in FIG. 1 at $16^1$ both positions being illustrated. The positioning of the primary turns within the mould improves the magnetic coupling efficiency.

Since the layer 5, on the interior surface of the moulding components and the electrically conducting stranded wires 12 17a and 17b in the moulding bag 10 are each closed conducting loops, currents will be induced in them. However, the size of the current will depend on the number of primary turns, the material of each of these loops, their thickness and their position relative to the magnetic field induced around the core 14. In general, the number of primary turns is far larger than the number of closed conducting loops so that currents induced within the mould is large.

The parts of the outer housing although conductive do not form closed rings to prevent any current being induced. The housing H is designed is prevent undue magnetic shielding which might reduce the heating effect.

In order to remove the tire mould M from the apparatus the top bar 18 of the core 14 is separable from the remainder.

It will be appreciated that since the thickness of the rubber composition varies throughout the tire the heating effect needed is more in the thicker regions and less in the thinner. The thickness and material of the conducting layer 5 on the moulding surface of the moulding components 2a, 2b, 6a, 6b, 30a, 30b respectively can therefore be adjusted accordingly. It is for this reason that the heating wires in the curing bag are limited to the crown region thereof (i.e. adjacent the tire tread) and to those parts of the bag adjacent the tire bead regions, it being appreciated that the tire tread and bead regions are the thicker and require more heating to effect adequate vulcanizing.

If the moulding components 2a, 2b, 6a, 6b, 30a, 30b are in the form of sectors each with their own individual conductive layer 5, care must be taken to ensure that there is good electrical contact between each part of the layer to prevent "hot spots" or uneven heating around the circumference of the tire.

Figure 5:
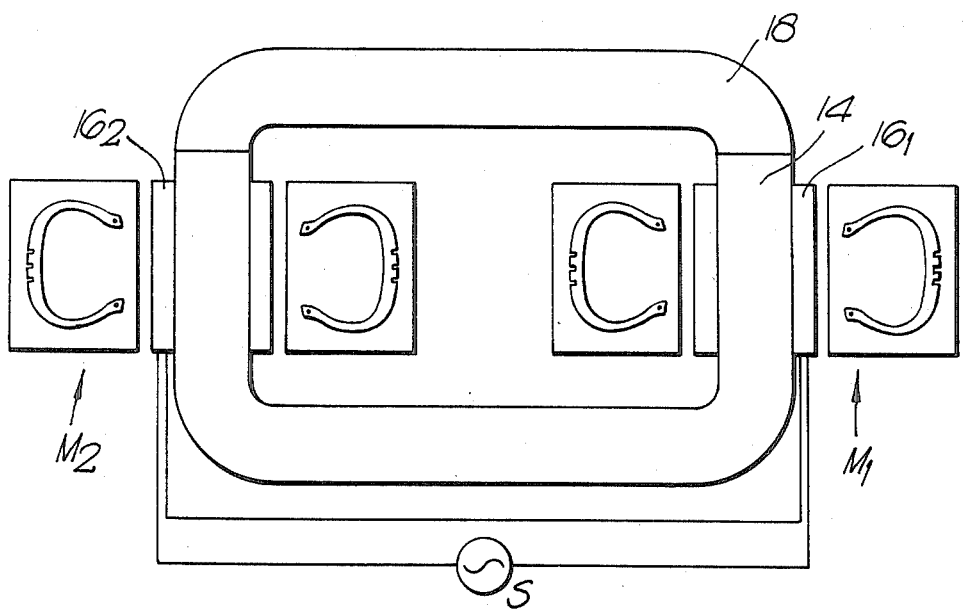
FIG. 5 shows a very simplified cross-sectional view of the second embodiment of the invention.

The embodiment illustrated in FIG. 5 shows an arrangement whereby two tires can be moulded simultaneously on the same core 14. Two moulds M1 and M2 are used and within each are two sets of primary turns $16_1$ and $16_2$ connected in series to a source of alternating current S.

The moulds just described may be used in retreading worn tires. In this case, since only part of the tire requires heating (mainly the tread and shoulders), the conducting layer 5 is restricted to the associated components e.g. the tread moulding components 2a and 2b, and the curing bag is devoid of conducting wires adjacent the sidewall and bead regions of the tire. The curing bag itself may be pressurized with cold fluid, e.g. air or nitrogen.

The invention is not limited to the heating of annular articles but may be used in the production of articles of other shapes. In this case a heating ring containing a plurality of circumferentially spaced-apart moulding cavities each for producing an article is used in place of the single tire mould described above.

We claim:
1. A tire mold defining the external shape of the tire and which is for vulcanizing a tire by means of electromagnetically induced heat and which comprises:
an outer housing having an outer ring divided into sectors and a pair of spaced apart external side members each formed by a plurality of spaced apart sector plates, the various parts of the housing being insulated from one another so that there is no complete electrically conductive ring around the outside of the mold, the outer housing being, capable of withstanding internal pressure applied to a tire during the vulcanization process, an inner mold surface located within the housing and formed from a layer of electrically conductive material, said inner mold surface being spaced from the outer housign to define a cavity therebetween;
and a thermally insulating material filling said cavity.
2. A tire mold as claimed in claim 1 in which the inner mold surface is formed from a layer of copper or copper alloy.
3. A tire vulcanizing apparatus including an annular mold as claimed in claim 1, and further comprising a means of inducing electromagnetic current in the mold, said means including a laminated closed loop core, a series of primary turns wrapped around the core such that when connected to a supply of alternating electrical current an alternating electromagnetic field is induced in the core, the core being arranged to pass through the center of the mold so that the inner surface layer of the mold acts as a secondary transformer turn.
4. The tire vulcanizing apparatus of claim 3 including an inflatable curing bag for positioning within a tire in the mold, said curing bag having electrical conductors in or on the bag wall to form a closed conducting loop.
5. A tire vulcanizing apparatus comprising:
an annular tire mold with an outer housing having an outer ring formed from two circumferentially extending half rings which are each further subdivided into semi-circular sectors and a pair of spaced apart external side members each formed from a plurality of spaced apart sectors, the various parts being insulated from one another so there is no complete electrically conductive loop around the outside of the mold, said outer housing being capable of withstanding internal pressure applied to a tire during the vulcanization process;

an inner mold surface located within the outer housing and spaced therefrom to define a cavity between the outer housing and inner mold, and a thermally insulating material filling said cavity;

said inner mold surface being shaped to conform to the outer surface of the tire being molded and formed of a closed loop of electrically conductive material;

a laminated closed loop core positioned to pass through the center of said annular mold, a series of primary electrical conductor turns wrapped around said closed loop core such that when connected to a source of alternating electrical current an alternating electromagnetic field is induced in the core which subsequently induces induction heating in said inner mold surface to vulcanize a tire within the inner mold.

6. The tire vulcanizing apparatus of claim 5 including an inflatable curing bag for positioning within a tire in the mold, said curing bag having electrical conductors in or on the bag wall to form a closed conducting loop in which induction heating is induced when positioned inside a tire in said inner mold surface.

* * * * *